US010059910B2

(12) United States Patent
Peters et al.

(10) Patent No.: US 10,059,910 B2
(45) Date of Patent: Aug. 28, 2018

(54) WASH WATER MAINTENANCE FOR SUSTAINABLE PRACTICES

(71) Applicant: Ecolab USA Inc., Saint Paul, MN (US)

(72) Inventors: Sara Peters, Rosemount, MN (US); Steven E. Lentsch, St. Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 90 days.

(21) Appl. No.: 15/178,700

(22) Filed: Jun. 10, 2016

(65) Prior Publication Data

US 2016/0281035 A1    Sep. 29, 2016

Related U.S. Application Data

(63) Continuation of application No. 12/859,889, filed on Aug. 20, 2010, now Pat. No. 9,388,369.

(51) Int. Cl.

| C11D 3/386 | (2006.01) |
| B08B 3/08 | (2006.01) |
| B08B 3/14 | (2006.01) |
| C11D 11/00 | (2006.01) |
| C02F 103/30 | (2006.01) |
| C02F 3/34 | (2006.01) |

(52) U.S. Cl.
CPC .............. *C11D 3/386* (2013.01); *B08B 3/08* (2013.01); *B08B 3/14* (2013.01); *C11D 11/0011* (2013.01); *C11D 11/0017* (2013.01); *C11D 11/0023* (2013.01); *C02F 3/342* (2013.01); *C02F 2103/30* (2013.01); *C02F 2305/04* (2013.01); *C02F 2307/12* (2013.01)

(58) Field of Classification Search
None
See application file for complete search history.

(56) References Cited

U.S. PATENT DOCUMENTS

| 3,841,116 | A | 10/1974 | Klein et al. |
| 4,468,333 | A | 8/1984 | Geiger |
| 4,610,800 | A | 9/1986 | Durham et al. |
| 4,936,994 | A | 6/1990 | Wiatr |
| 5,284,587 | A | 2/1994 | Wong et al. |
| 5,310,679 | A | 5/1994 | Artiss et al. |
| 5,459,066 | A | 10/1995 | Mestetsky |
| 5,531,898 | A | 7/1996 | Wickham |
| 5,580,394 | A | 12/1996 | Freytag |
| 5,769,933 | A | 6/1998 | Landis |
| 5,801,140 | A | 9/1998 | Langley et al. |
| 5,837,663 | A | 11/1998 | Nicholson et al. |
| 5,858,117 | A | 1/1999 | Oakes et al. |
| 5,861,366 | A | 1/1999 | Ihns et al. |
| 5,885,459 | A | 3/1999 | Lerche et al. |
| 5,931,172 | A | 8/1999 | Steer et al. |
| 6,197,739 | B1 | 3/2001 | Oakes et al. |
| 6,240,585 | B1 * | 6/2001 | Praechter ............ C02F 1/008 |
|  |  |  | 210/705 |
| 6,471,728 | B2 | 10/2002 | Smith et al. |
| 6,624,132 | B1 | 9/2003 | Man et al. |
| 6,638,902 | B2 | 10/2003 | Tarara et al. |
| 6,718,991 | B1 | 4/2004 | Breyer et al. |
| 6,802,956 | B2 | 10/2004 | Orlebeke |
| 7,083,727 | B2 | 8/2006 | Tanaka et al. |
| 7,144,509 | B2 | 12/2006 | Boyd et al. |
| 7,491,362 | B1 | 2/2009 | Geret et al. |
| 7,553,806 | B2 | 6/2009 | Man et al. |
| 7,569,532 | B2 | 8/2009 | Man et al. |
| 7,670,549 | B2 | 3/2010 | Geret et al. |
| 7,723,281 | B1 | 5/2010 | Herdt et al. |
| 2002/0198127 | A1 | 12/2002 | Adriaanse et al. |
| 2004/0072714 | A1 | 4/2004 | Tarara et al. |
| 2006/0002886 | A1 | 1/2006 | Schur et al. |
| 2006/0293212 | A1 | 12/2006 | Griese et al. |
| 2007/0022789 | A1 | 2/2007 | Heiligenmann et al. |
| 2010/0095988 | A1 | 4/2010 | Geret et al. |
| 2010/0144578 | A1 | 6/2010 | Smith et al. |

FOREIGN PATENT DOCUMENTS

| CN | 1239986 A | 12/1999 |
| CN | 101528907 A | 9/2009 |
| EP | 1151967 A1 | 11/2001 |
| EP | 1153892 A1 | 11/2001 |
| EP | 1236689 A1 | 9/2002 |
| JP | 6510476 A | 11/1994 |
| JP | 1994510476 A | 11/1994 |
| JP | 10118671 A | 5/1998 |
| JP | 2004290505 A | 10/2004 |
| JP | 200634473 A | 2/2006 |
| WO | 9305187 A1 | 3/1993 |
| WO | 0185625 A1 | 11/2001 |
| WO | 2008147296 A1 | 12/2008 |

OTHER PUBLICATIONS

Japanese Patent Office, "Decision of Final Rejection" (translation), issued in connection with Japanese Patent Application No. 2013-524504, 2 pages, dated Dec. 8, 2015.
Japanese Patent Office, "Notice of Reasons for Rejection" (translation) issued in connection with Japanese Patent Application No. 2013-524504, dated Mar. 31, 2015, 3 pages.
European Patent Office, "Extended European Search Report", issued in connection to PCT/IB2011/053626, Application No./Patent No. 11817849.0-1358/2606009, dated Mar. 4, 2014.
"Layperson's Guide to Water Recycling" publication updated in 2004 by the Water Education Foundation, attached as a PDF. pp. 1-24.
Ecolab USA, Inc., et al., PCT/IB2011/053626, Notification of Transmittal of the International Search Report and the Written Opinion of the International Searching Authority, 14 pages, dated Apr. 23, 2012.

\* cited by examiner

*Primary Examiner* — Katie L Hammer
(74) *Attorney, Agent, or Firm* — McKee, Voorhees & Sease, PLC

(57) ABSTRACT

Methods for use of enzymes for sustainable wash water maintenance are disclosed. The invention relates to use of enzymes for removing soils from wash water sources in a variety of cleaning applications. The invention cleans wash water sources, prevents the re-deposition of soils on treated surfaces and enhances detergency. Methods of wash water maintenance according to the invention provide sustainable practices by improving water quality and minimizing water and energy consumption in wash systems.

20 Claims, No Drawings

WASH WATER MAINTENANCE FOR SUSTAINABLE PRACTICES

CROSS-REFERENCE TO RELATED APPLICATIONS

This application is a Continuation of U.S. patent application Ser. No. 12/859,889 filed Aug. 20, 2010, herein incorporated by reference in its entirety.

FIELD OF THE INVENTION

The invention relates to use of enzymes for sustainable wash water treatment and maintenance. In particular, the invention relates to use of enzymes for effectively removing soils from wash water sources, such as the wash liquor or wash water solutions in a variety of cleaning applications, namely sumps. The invention cleans wash water sources and prevents the re-deposition of soils on treated surfaces. The methods according to the invention provide further benefits of improving the efficacy of detergents in treating surfaces, such as ware and wash equipment, as a result of cleaning wash water sources. Methods of wash water maintenance according to the invention provide sustainable practices by improving water quality and minimizing water and energy consumption in wash systems.

BACKGROUND OF THE INVENTION

Enzymes have been employed in cleaning compositions since early in the 20th century. It was not until the mid 1960's when enzymes were commercially available with both the pH stability and soil reactivity for detergent applications. Enzymes are known as effective chemicals for use with detergents and other cleaning agents to break down soils. Enzymes break down soils making them more soluble and enabling surfactants to remove them from a surface and provided enhanced cleaning of a substrate.

Enzymes can provide desirable activity for removal of protein-based, carbohydrate-based, or triglyceride-based stains from substrates. As a result, enzymes have been used for various cleaning applications in order to digest or degrade soils such as grease, oils (e.g., vegetable oils or animal fat), protein, carbohydrate, or the like. For example, enzymes may be added as a component of a composition for laundry, textiles, ware washing, cleaning-in-place, drains, floors, carpets, medical or dental instruments, meat cutting tools, hard surfaces, personal care, or the like. However, enzyme cleaning products only focused on ability to remove soils from substrates. Although enzyme products have evolved from simple powders containing alkaline protease to more complex granular compositions containing multiple enzymes and still further to liquid compositions containing enzymes, there remains a need for alternative cleaning applications for enzymes.

Accordingly, it is an objective of the invention to develop methods for use of enzymes to remove soils from wash water sources.

A further object of the invention is to develop methods for improving sustainability of cleaning processes, such as decreasing the amounts of water and energy required for such processes through the cleaning of wash water sources with enzymes.

BRIEF SUMMARY OF THE INVENTION

A method for washing a wash water source is provided according to the invention. The method includes steps of generating an enzyme composition and cleaning a wash water source. A method for removing soils and improving quality of waste water from a wash water source is also provided according to the invention. The method includes generating an enzyme composition and washing a wash water source with an aqueous use solution, wherein the washing removes soils from the wash water source to improve the quality of a waste water source generated from said wash water source.

The enzyme composition according to embodiments of the invention forms an aqueous use solution that can be obtained by contacting the enzyme composition with water, and allowing the formed aqueous use solution to drain from the enzyme composition. According to an alternative embodiment, the aqueous use solution can be obtained by contacting a detergent composition and an enzyme composition or a combination detergent/enzyme composition with water, and allowing the formed aqueous use solution to drain from the detergent and enzyme compositions. The detergent composition and enzyme composition may be formulated in combination or separately according to use in the methods of the invention. The active level of the aqueous use solution is adjusted to a desired level through control of variables such as the amount of active enzymes in the detergent and enzyme compositions, length of time and the temperature at which the water contacts the detergent and enzyme compositions.

The particular enzyme or combination of enzymes for use in the methods of the invention depends upon the conditions of final utility, including the physical product form, use pH, use temperature, and soil types to be cleaned with a wash water source. The enzyme or combination of enzymes are selected to provide optimum activity and stability for a given set of utility conditions as one skilled in the art will recognize based on the disclosure of the claimed invention.

These and other methods described herein according to the invention provide the benefit of sustainably treating wash water sources. For example, methods of cleaning wash water sources with enzymes decrease the total amount of water needed for cleaning applications. Such water reduction is a result of significantly decreasing the frequency at which wash water needs to be replaced with a clean wash water source. This presents a significant advantage over prior art cleaning applications, where wash water sources need to be frequently replaced in order to minimize the re-depositing of soils from wash water sources that are recirculated in a cleaning system. Traditionally, without the frequent replacement of soiled wash water sources with clean wash water such soils will re-deposit in a cleaning system. This need is significantly minimized, if not obviated, according to the advantages provided by the present invention.

DETAILED DESCRIPTION OF THE PREFERRED EMBODIMENT

The embodiments of this invention are not limited to particular methods of cleaning wash water sources, removing soils from wash water and improving the quality of wash water, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities refers to variation in the numerical quantity that can occur.

The term "wash water," "wash water source," "wash liquor," "wash water solution," and the like, as used herein, refer to water sources that have been contaminated with soils from a cleaning application and are used to circulate or re-circulate water containing detergents or other cleaning agents used in cleaning applications to treat various surfaces. According to certain regulated cleaning applications, wash water is required to be regularly discarded and replaced with clean water for use as wash water in cleaning applications. For example, certain regulations require wash water to be replaced at least every four hours to maintain sufficiently clean water sources for cleaning applications. Wash water, according to the invention, is not limited according to the source of water. Exemplary water sources suitable for use as a wash water source include, but are not limited to, water from a municipal water source, or private water system, e.g., a public water supply or a well, or any water source containing some hardness ions. Accordingly, wash water is understood to only exclude deionized water sources which are known to deactivate enzymes.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

According to an embodiment of the invention, wash water solutions are cleaned by enzymes in order to provide sustainable water maintenance methods and enhance cleaning of treated surfaces through improvements in detergency. Enzymes are used according to the methods of the invention to effectively remove soils from wash water in order to clean wash water and provide enhanced longevity of use of such wash water for cleaning applications as well as enhance the quality of discarded waste water sources. In addition, the methods of using enzymes to clean a wash water source further promote cleaning of various surfaces, including ware, sump and the wash equipment surfaces itself, such as the interior of a washing machine by improving the detergency of the cleaning application.

Methods of Use

The methods of using enzyme compositions according to the invention include cleaning a wash water solution. The methods of use of enzyme compositions according to the invention further include methods of removing soils and improving the quality of waste water sources from wash water in various cleaning applications. According to embodiments of the invention, enzymes reduce or eliminate soil content in wash water sources. Preferred embodiments of the invention provide complete elimination of soil levels in a wash water source with the use of enzymes according to the methods of the invention. Additional benefits of providing enhanced cleaning and sustainability are also described according to the invention.

According to a further embodiment of the invention, methods of cleaning wash water sources further result in the prevention of and removal of soil buildup on the interior surfaces of cleaning equipment and treated surfaces contained therein. Such surfaces may be either removable or permanent surfaces of cleaning equipment.

According to the methods of the invention, enzyme compositions may be introduced, for example, manually or by a dispenser, pump, pump and control system or other means into a wash water source. According to the invention, an aqueous use solution for cleaning a wash water source is generated by adding an enzyme composition to a water source. In numerous cleaning applications the water source will be the wash water source. According to an alternative embodiment of the invention, an aqueous use solution may be generated by adding an enzyme composition, detergent composition or a combined enzyme and detergent composition to a water source, such as the wash water source. According to the invention, the detergent composition and enzyme composition may be formulated either in combination or separately.

According to the invention, the active level of enzyme in the aqueous use solution may be modified according to the precise requirements of the cleaning application. For example, the amount of enzyme formulated into the enzyme composition may vary. Alternatively, as one skilled in the art will appreciate, the active level of the aqueous use solution may be adjusted to a desired level through control of the wash time, water temperature at which the water source contacts the enzyme composition or the enzyme and detergent composition in order to form the aqueous use solution and the detergent selection and concentration. According to a preferred embodiment, an aqueous use solution comprises between approximately 0.1 ppm and 100 ppm enzyme, preferably between about 0.5 ppm and about 50 ppm, and more preferably between approximately 1 ppm and 20 ppm enzyme.

According to further embodiments of the invention, the amount of enzyme needed to clean and remove soils from a particular wash water source varies according to the type of cleaning application and the soils encountered in such applications. According to various embodiments of the invention, levels of enzymes in an aqueous use solution are effective at or below approximately 0.1 ppm, 0.5 ppm or 1 ppm. According to alternative embodiments, use levels of enzymes may be as great as 100 ppm, with most applications utilizing enzymes in aqueous use solutions between approximately 1-10 ppm.

One skilled in the art will appreciate that the methods according to the invention can be used for a variety of cleaning applications, such as ware washing, laundry washing, and other applications. For example, ware washing applications according to the invention may include ware wash sump cleaning, ware wash machine cleaning (automated and/or manual) and holding tank cleaning. Laundry applications according to the invention may include the cleaning of laundry sumps. Additional cleaning applications may include cleaning of waste water in vehicle care applications, such as the cleaning of wash water solutions contacting oils, grease and other soils. Still further, cleaning applications in health care may further benefit from the methods according to the invention, including for example, cleaning waste water or rinse water sources for cleaning applications used in health care facilities.

The methods according to the invention may further be used in any wash water treatment application wherein water sustainability is desired. According to the embodiments of the invention, cleaning a wash water source by removing soils from the water increases the time frame in which water changes are required, such that less water is used due to decreased need to replace wash water. The use of enzymes to clean the wash water source improves the wash water quality and permits prolonged use of the wash water source. Such prolonged use decreases the volume of clean water used in a cleaning application and decreases the amount of energy used to heat wash water sources for various cleaning applications. As an additional benefit, the quality of waste water disposed of from a cleaning application is improved, providing environmental benefits.

Enzyme Compositions

The enzyme compositions for use in the methods according to the invention provide enzymes for washing, removing soils and improving the quality of waste water from a wash water source. The purpose of the enzyme composition is to break down adherent soils, such as starch or proteinaceous materials, typically found in soiled surfaces and removed by a detergent composition into a wash water source. The enzyme compositions decrease and/or eliminate the soils in wash water sources once the soils become readily dispersed into the wash water by a detergent or other cleaning agent.

Exemplary types of enzymes which can be incorporated into the enzyme composition according to the invention include amylase, protease, lipase, cellulase, cutinase, gluconase, peroxidase and/or mixtures thereof. An enzyme composition according to the invention may employ more than one enzyme, from any suitable origin, such as vegetable, animal, bacterial, fungal or yeast origin. According to an embodiment of the invention, the enzyme composition includes at least two different enzymes. According to a further embodiment of the invention, mixtures of the same class of enzymes are incorporated into an enzyme composition, such as a mixture of various amylase enzymes.

Examples of commercially-available amylase enzymes are available under the following trade names: Purastar, Purastar ST, HP AmL, Maxamyl, Duramyl, Termamyl and Stainzyme. Examples of commercially-available protease enzymes are available under the following trade names: Purafect, Purafect L, Purafect Ox, Everlase, Liquanase, Savinase, Esperase, Prime L, Prosperase and Blap. Lipases are commercially available, for example, under the trade name Lipex and Lipolase. Cellulase enzymes are commercially-available, for example, under the trade name Celluzyme.

According to the invention, the enzyme composition may be varied based on the particular cleaning application and the types of soils in need of cleaning. For example, the temperature of a particular cleaning application will impact the enzymes selected for an enzyme composition according to the invention. Ware wash applications, for example, clean substrates at temperatures in excess of approximately 105° F. and enzymes such as amylases and proteases are desirable due to their ability to retain activity at such elevated temperatures.

In addition, as one skilled in the art shall ascertain, enzymes are designed to work with specific types of soils. For example, according to an embodiment of the invention, ware wash applications may use an amylase enzyme as it is effective at the high temperatures of the ware wash machines and is effective in reducing starchy, carbohydrate-based soils. Although not limiting the present invention, it is believed that amylase can be advantageous for cleaning soils containing starch. Amylase enzymes can be obtained from any suitable source, such as bacterial strains, barley malt, certain animal glandular tissues and any others known to the art. Amylase enzymes may include those which are referred to as alpha-amylases, beta-amylases, iso-amylases, pullulanases, maltogenic amylases, amyloglucosidases, and glucoamylases, as well as other amylases enzymes not particularly identified herein. These also include endo- and exo-active amylases.

According to an alternative embodiment, methods of cleaning wash water sources in a laundry machine may use a combination of amylase and protease enzymes in order to most effectively prevent starch, proteins and oils from hindering detergent performance. Although not limiting the present invention, it is believed that protease can be advantageous for cleaning soils containing protein, such as blood, cutaneous scales, mucus, grass, food (e.g., egg, milk, spinach, meat residue, tomato sauce), or the like. Protease enzymes are capable of cleaving macromolecular protein links of amino acid residues and convert substrates into small fragments that are readily dissolved or dispersed into a wash water source. Proteases are often referred to as detersive enzymes due to the ability to break soils through the chemical reaction known as hydrolysis. Protease enzymes can be obtained, for example, from *Bacillus subtilis*, *Bacillus licheniformis* and *Streptomyces griseus*. Protease enzymes are also commercially available as serine endoproteases.

According to an additional embodiment of the invention, a cellulose or lipase enzyme may be incorporated into an enzyme composition. Although not limiting the present invention, it is believed that cellulase can be advantageous for cleaning soils containing cellulose or containing cellulose fibers that serve as attachment points for other soil. Although not limiting to the present invention, it is believed that lipase enzymes can be advantageous for cleaning soils containing fat, oil, or wax, such as animal or vegetable fat, oil, or wax (e.g., salad dressing, butter, lard, chocolate, lipstick). Both cellulase and lipase enzymes can be derived from a plant, an animal, or a microorganism, such as a fungus or a bacterium. A cellulase or lipase enzyme can be purified or a component of an extract, and either wild type or variant (either chemical or recombinant).

Additional enzymes suitable for certain embodiments of the invention include cutinase, peroxidase, gluconase, and the like. Suitable enzymes are described for example in WO 8809367 (cutinase), WO 89099813 and WO 8909813 (peroxidases), and WO 9307263 and WO 9307260 (gluconase). Known peroxidase enzymes include horseradish peroxidase, ligninase, and haloperoxidases such as chloro- or bromo-peroxidase. Peroxidase enzymes can be used in combination with oxygen sources, e.g., percarbonate, perborate, hydrogen peroxide, and the like. Each of these enzymes may be derived from a plant, an animal, or a microorganism and can be purified or a component of an extract, and either wild type or variant (either chemical or recombinant).

The enzyme compositions according to the invention may be an independent entity and/or may be formulated in combination with a detergent composition. According to an embodiment of the invention, an enzyme composition may be formulated into a detergent composition in either liquid or solid formulations. In addition, enzyme compositions may be formulated into various delayed or controlled release formulations. For example, a solid molded detergent composition may be prepared without the addition of heat. As a skilled artisan will appreciate, enzymes tend to become denatured by the application of heat and therefore use of enzymes within detergent compositions require methods of forming a detergent compositions that does not rely upon heat as a step in the formation process, such as solidification.

The enzyme composition may further be obtained commercially in a solid (i.e., puck, powder, etc.) or liquid formulation. Commercially-available enzymes are generally combined with stabilizers, buffers, cofactors and inert vehicles. The actual active enzyme content depends upon the method of manufacture, which is well known to a skilled artisan and such methods of manufacture are not critical to the present invention.

Additional description of enzyme compositions suitable for use according to the invention is disclosed for example in U.S. Pat. Nos. 7,670,549, 7,723,281, 7,670,549, 7,553,806, 7,491,362, 6,638,902, 6,624,132, 6,197,739 and U.S. patent application Ser. No. 12/642,091 filed Dec. 18, 2009 titled "Multiple Enzyme Cleaner for Surgical Instruments and Endoscopes," Ser. No. 11/279,654, filed Apr. 13, 2006 titled "Stable Solid Compositions of Spores, Bacteria, Fungi and/or Enzyme," Ser. No. 10/654,333, filed Sep. 2, 2003 titled "Stable Solid Enzyme Compositions and Methods Employing Them," the contents of which are incorporated by reference in its entirety. In addition, the reference "Industrial Enzymes", Scott, D., in Kirk-Othmer Encyclopedia of Chemical Technology, 3rd Edition, (editors Grayson, M. and EcKroth, D.) Vol. 9, pp. 173-224, John Wiley & Sons, New York, 1980 is incorporated herein in its entirety.

Enzyme Stabilizers

The enzyme compositions for use in the methods of the present invention may further include enzyme stabilizers. One skilled in the art will ascertain suitable enzyme stabilizers and/or stabilizing systems for enzyme compositions suitable for use according to the invention, such as those described, for example, in U.S. Pat. Nos. 7,569,532 and 6,638,902, which are incorporated herein in their entirety. According to an embodiment of the invention, an enzyme stabilizing system may include a mixture of carbonate and bicarbonate and can also include other ingredients to stabilize certain enzymes or to enhance or maintain the effect of the mixture of carbonate and bicarbonate. An enzyme stabilizer may further include boron compounds or calcium salts. For example, enzyme stabilizers may be boron compounds selected from the group consisting of boronic acid, boric acid, borate, polyborate and combinations thereof.

Enzyme stabilizers may also include chlorine bleach scavengers added to prevent chlorine bleach species present from attacking and inactivating the enzymes especially under alkaline conditions. As one skilled in the art shall ascertain, methods according to the invention are based upon the activity of enzyme compositions cleaning wash water sources. Therefore, suitable chlorine scavenger anions may be added as an enzyme stabilizer to prevent the deactivation of the enzyme compositions according to the invention. Exemplary chlorine scavenger anions include salts containing ammonium cations with sulfite, bisulfite, thiosulfite, thiosulfate, iodide, etc. Antioxidants such as carbamate, ascorbate, etc., organic amines such as ethylenediaminetetracetic acid (EDTA) or alkali metal salt thereof, monoethanolamine (MEA), and mixtures thereof can also be used.

According to alternative embodiments of the invention, the enzyme compositions for use in the methods of the present invention are preferably free of enzyme stabilizers. According to a preferred embodiment, the enzyme compositions are free of any enzyme-stabilizing Ca or Mg source.

Detergent Compositions

Methods according to the invention use an aqueous use solution which may comprise a detergent composition in combination with the enzyme composition. The methods according to the invention are directed to cleaning a wash water source, having numerous beneficial results, including enhancing the detergency of a cleaning agent used in combination with the methods of the invention. According to an embodiment of the invention, enzymes are cleaning the wash water and not substrates within a cleaning application, largely due to the short duration of contact between enzymes and a substrate. However, the enzyme compositions according to the invention assist in cleaning substrates of a cleaning application by enhancing the ability of a detergent to work in the water rather than being consumed by the soils in the wash water. As a result, a detergent composition is more effective on the surface of the substrates for cleaning purposes.

According to the invention, the detergent composition may be liquids or solids, including for example molded compositions, as are appreciated by those skilled in the art. Pastes and gels can be considered types of liquid. Powders, agglomerates, pellets, tablets, and blocks can be considered types of solid. For example, detergent compositions may be provided in the form of blocks, pellets, powders (i.e., mixture of granular dry material), agglomerates and/or liquids under room temperature and atmosphere pressure conditions. Powder detergents are often prepared by mixing dry materials or by mixing a slurry and drying the slurry. Pellets and blocks are typically provided with a size that is determined by the shape or configuration of the mold or extruder through which the detergent composition is compressed. Pellets are generally characterized as having an average diameter of about 0.5 cm to about 2 cm. Blocks are generally characterized as having an average diameter of greater than about 2 cm, preferably between about 2 cm and about 2 ft, and can have an average diameter of between about 2 cm and about 1 ft. According to a preferred embodiment, a solid block is at least 50 grams.

According to certain embodiments of the invention, the detergent composition is substantially free of phosphorous. Substantially phosphorous-free refers to a composition to which phosphorous-containing compounds are not added. In an exemplary embodiment, the cleaning composition includes less than approximately 10% phosphates, phosphonates, and phosphites, or mixtures thereof by weight. Preferably, the detergent composition includes less than approximately 5% phosphates, phosphonates, and phosphites by weight. More preferably, the detergent composition includes less than approximately 1% phosphates, phosphonates, and phosphites by weight. Most preferably, the detergent composition includes less than approximately 0.1% phosphates, phosphonates, and phosphites by weight.

Additional description of detergent compositions, and methods of formation of the same, suitable for use according to the invention are disclosed, for example, in U.S. Pat. Nos.

7,674,763, 7,153,820, 7,094,746 and 6,924,257 and U.S. patent application Ser. No. 12/695,370, filed Jan. 28, 2010 titled "Method for Washing an Article using a Molded Detergent Composition," the contents of which are incorporated by reference in its entirety.

Use of detergent compositions with the aqueous use solution according to the invention can be used in conventional detergent dispensing equipment. For example, commercially available detergent dispensing equipment which can be used according to the invention are available under the name Solid System™ from Ecolab, Inc. Use of such dispensing equipment results in the erosion of a detergent composition by a water source to form the aqueous use solution according to the invention.

Additional Components

Methods according to the invention using an aqueous use solution may further comprise additional components to be used in combination with the enzyme composition, detergent composition and/or combination enzyme and detergent composition. Additional components which can be incorporated into the enzyme composition, detergent composition, combined enzyme and detergent composition and/or added independently to the water source include solvents, dyes, fragrances, anti-redeposition agents, corrosion inhibitors, buffering agents, defoamers, antimicrobial agents, preservatives, chelators, bleaching agents and combinations of the same.

Exemplary aesthetic additives which can be used as additional components include dyes and fragrances, such as dye #2, and a preferred fragrance includes lemon fragrance. Exemplary anti-redeposition agents which can be incorporated according to the invention include sodium carboxy methylcellulose, sodium polyacrylate, and hydroxypropyl cellulose. Exemplary corrosion inhibitors which can be incorporated according to the invention include triethanolamine, and doderylamine. Numerous additional corrosion inhibitors can be incorporated and are described, for example, in U.S. patent application Ser. No. 12/617,419, filed Nov. 12, 2009 titled "Warewashing Composition for Use in Automatic Dishwashing Machines, and Methods for Manufacturing and Using," the contents of which are incorporated by reference in its entirety. Additional anti-etch agents can be further utilized to reduce the etching or corrosion found on certain surfaces treated with detergent compositions. Examples of suitable anti-etch agents include adding metal ions to the composition such as zinc, zinc chloride, zinc gluconate, aluminum, and beryllium. However, according to certain embodiments of the invention, anti-etch agents are not required for use of the methods of the present invention.

Exemplary buffering agents which can be incorporated according to the invention include sodium acetate, potassium dihydrogen phosphate, and sodium borate. Exemplary defoamers which can be incorporated according to the invention include polymeric silicone derivatives, and alkynol derivatives. Exemplary antimicrobial agents which can be incorporated may include paraben materials such as propyl paraben. Additional antimicrobial agents which can be incorporated according to the invention include tert-amylphenol, quaternary ammonium compounds, and active halogen containing compounds. Exemplary chelators which can be incorporated according to the invention include nitrilotriacetic acid (NTA) and ethylenediaminetetraacetic acid (EDTA) to help control scale, remove soils, and/or sequester metal ions such as calcium, magnesium and iron.

Bleaching agents may also be incorporated according to the invention in order to lighten or whiten a substrate, and can include bleaching compounds capable of liberating an active halogen species, such as $Cl_2$, $Br_2$—OCl— and/or —OBr—, or the like, under conditions typically encountered during the cleansing process. Examples of suitable bleaching agents include, but are not limited to: chlorine-containing compounds such as chlorine, a hypochlorite or chloramines. Examples of suitable halogen-releasing compounds include, but are not limited to: alkali metal dichloroisocyanurates, alkali metal hypochlorites, monochloramine, and dichloroamine. Encapsulated chlorine sources may also be used to enhance the stability of the chlorine source in the composition (see, for example, U.S. Pat. Nos. 4,618,914 and 4,830,773, the disclosures of which are incorporated by reference herein). The bleaching agent may also include an agent containing or acting as a source of active oxygen. The active oxygen compound acts to provide a source of active oxygen and may release active oxygen in aqueous solutions. An active oxygen compound can be inorganic, organic or a mixture thereof. Examples of suitable active oxygen compounds include, but are not limited to: peroxygen compounds, peroxygen compound adducts, hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine. It is to be appreciated by a skilled artisan that certain embodiments of the invention preferably use compositions that are chlorine-free to promote the use of enzymes according to the invention.

One skilled in the art shall ascertain additional components that may be used in combination with the methods of the present invention.

All publications and patent applications in this specification are indicative of the level of ordinary skill in the art to which this invention pertains. All publications and patent applications are herein incorporated by reference to the same extent as if each individual publication or patent application was specifically and individually indicated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Field testing evaluated the viability of adding an enzyme to Apex™ ware washing detergent in order to reduce starch levels in the wash water of a commercial dish machine sump. Testing hypothesized that achieving a reduction in starch would necessitate less detergent for food soils while yielding better glassware results. A positive test result for a product was achieved if compared to baseline product the formulation with the enzyme composition demonstrated decrease in starch levels in the dish machine sump. In addition comparable capsule yield and glassware results were analyzed. Power Fusion™ was used as the baseline product (control) having the following formulation:

| Raw Material | % of Formula |
|---|---|
| Potassium Hydroxide | 9.1 |
| Hydroxyethylidene-diphosphonic acid | 6.3 |
| Corrosion Inhibitor | 0.1 |
| Nonionic Surfactant | 3.7 |
| Sodium Carbonate | 49.5 |
| STPP | 25.0 |
| Silicate | 3 |
| Enzyme | 0 |
| Chlorine | 3.3 |
| TOTAL | 100.0 |

Baseline testing consisted of monitoring detergent product usage through total rinse time, rack counts and product inventory for several months. In addition, the general condition of the glassware was observed. Weekly field testing was completed to obtain the following data for the enzyme-containing formulation: product yield (rinse time, rack counts and product inventory); product performance (glass and silverware samples were monitored to check for significant increases or decreases in ware quality); customer perception; and starch levels (water samples were taken from the dish machine sump and tested for the presence of starch). Starch levels were obtained and measured according to the following methods: (1) Obtain sump sample and store in refrigerator to halt the enzyme process and preserves the sample from spoilage; (2) Remove sample from refrigerator and shake to mix solution; (3) Dose out a volumetric amount of 50 mls into a graduated cylinder; (4) Using suction filtration, pour sample into the filter apparatus; (5) Add two disposable pipets of iodine solution (taken from a starch amylase test) to the solution in the filter apparatus (approximately 4 mL); (6) Wait until all liquid is drawn through and only the soil remains on the filter paper; (7) Turn off suction and remove filter paper to set aside to dry.

The enzyme tested was an amylase enzyme. Formulations were adjusted to remove chlorine and increase sodium carbonate concentration from the above baseline ware wash formula. The amylase enzymes are commercially available as Purastar ST (RM320039) and Stainzyme 12T (320100). Formulations using a 1% Amylase and 0.1% Amylase were tested. The enzyme was subsequently switched to Stainzyme for further testing of a different amylase enzyme. Formulations using a 0.1% Stainzyme and 0.05% Stainzyme were also tested. Starch levels were tested weekly in the sump and were analyzed by visual assessments obtained from gross quantification through filtration. The presence of starch on the filter paper was indicated by blue and brown specs on the filter paper.

The tested enzyme products had the following formulations:

| Raw Material | % of Formula | % of Formula | % of Formula |
|---|---|---|---|
| Potassium Hydroxide | 9.1 | 9.1 | 9.1 |
| Hydroxyethylidene-diphosphonic acid | 6.3 | 6.3 | 6.3 |
| Corrosion Inhibitor | 0.1 | 0.1 | 0.1 |
| Nonionic Surfactant | 3.7 | 3.7 | 3.7 |
| Sodium Carbonate | 51.8 | 52.7 | 52.75 |
| STPP | 25.0 | 25.0 | 25.0 |
| Silicate | 3 | 3 | 3 |
| Enzyme | 1.0 | 0.1 | 0.05 |
| Chlorine | 0 | 0 | 0 |
| TOTAL | 100 | 100 | 100 |

Results. Change from baseline detergent use to 1.0% Amylase resulted in an initial increase in starch levels, hypothesized to result from the enzymes removal of starch built-up on the sump walls. Once this starch was removed, the enzyme was able to handle the normal, daily starch load, with little to no starch detected in the sump by week four. The ware wash systems were subsequently switched from 1% to 0.1% Amylase product. An initial increase in starch levels were observed in the sump. This elevated starch level was observed for four weeks. Thereafter, the level detected increased over the next five weeks.

After completed testing with the Amylase formulas, the enzyme Stainzyme was tested. First, another Apex™ baseline was conducted for two weeks and tested for the presence of starch. Thereafter, the 0.1% Stainzyme formula was used. An initial increase in the starch levels was again detected. The peak, similar to the one observed in the Apex™ baseline for the Amylase test was hypothesized to result from the enzyme cleaning the starch build-up off the walls of the sump that had accumulated during normal Apex™ use. By week three the starch levels subsided. The ware wash systems were subsequently switched from 0.1% Stainzyme product to the 0.05% formulation. Immediately upon switching to the 0.05% Stainzyme formula, starch level increased. Notably, a reverse osmosis water treatment system was installed for the ware wash machine during testing with the 0.05% Stainzyme formulation, likely deactivating the enzyme.

Both amylase enzyme formulations, Amylase and Stainzyme, reduced starch levels in the sump of the treated ware wash systems, while maintaining good cleaning performance on the wares. Increased concentration of the enzymes provided enhanced results. For the Amylase product, the 1.0% formulation took approximately four weeks to clean out the sump and then maintained a very low starch level compared to the Apex™ baseline. However, when the concentration of Amylase was reduced the starch levels increased. For the Stainzyme product, the 0.1% formula took only three weeks to clean out the sump and to yield low starch levels. When the Stainzyme concentration was reduced, the starch levels in the sump increased as this lower level of enzyme was unable to keep up with the starch loads introduced to the sump.

In addition to monitoring starch levels, customer feedback and product performance did not change throughout the testing, illustrating no significant change, either increase or decrease, in the amount of streaking and spotting on glassware.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A method for maintaining a laundry water source comprising:
   (a) generating an aqueous use solution by contacting an enzyme composition with water, wherein said aqueous use solution is between approximately 0.1 ppm and 100 ppm enzyme;
   (b) cleaning a laundry water source with said aqueous use solution; and
   (c) recirculating the laundry water source in a cleaning system.

2. The method of claim 1, wherein said enzyme is an amylase, protease or lipase.

3. The method of claim 1, wherein said enzyme is a combination of one or more amylase, protease, lipase, cellulase, cutinase, gluconase and/or peroxidase enzymes.

4. The method of claim 1, wherein said aqueous use solution further comprises a detergent composition.

5. The method of claim 4, wherein said detergent composition is a liquid or solid molded detergent composition.

6. The method of claim 1, further comprising adding a detergent composition to clean substrates contacted with said detergent and laundry water source.

7. The method of claim 6, wherein said washing step further comprises washing a plurality of substrates contacted with said detergent composition and demonstrating enhanced detergency over cleaning applications without laundry water sources cleaned with said aqueous use solution.

8. The method of claim 7, wherein said substrates are textiles.

9. The method of claim 1, wherein said enzyme composition further comprises at least one additional component selected from the group consisting of solvents, dyes, fragrances, anti-redeposition agents, corrosion inhibitors, buffering agents, defoamers, anti-microbial agents, preservatives, chelators and combinations of the same.

10. The method of claim 1, wherein said aqueous use solution is between approximately 0.1 ppm and about 50 ppm enzyme.

11. The method of claim 1, wherein said aqueous use solution is between approximately 0.1 ppm and 20 ppm enzyme.

12. A method for removing soils and improving quality of waste water from a laundry water source comprising:
   (a) generating aqueous use solution by contacting an enzyme composition with a water source, wherein said aqueous use solution has between approximately 0.1 ppm and 100 ppm enzyme; and
   (b) washing a laundry water source with said aqueous use solution, wherein said washing removes soils from said laundry water source to improve the quality of a waste water source generated from said laundry water source; and
   (c) recirculating the laundry water source in a cleaning system.

13. The method of claim 12 wherein said removal of soil is quantified by a reduction in soil levels in said laundry water source.

14. The method of claim 12, wherein said enzyme is an amylase or a protease.

15. The method of claim 12, wherein said enzyme is a combination of one or more amylase, protease, lipase, cellulase, cutinase, gluconase and/or peroxidase enzymes.

16. The method of claim 12, wherein said aqueous use solution further comprises a liquid or solid detergent composition.

17. The method of claim 12, wherein said enzyme composition further comprises at least one additional component selected from the group consisting of solvents, dyes, fragrances, anti-redeposition agents, corrosion inhibitors, buffering agents, defoamers, anti-microbial agents, preservatives, chelators and combinations of the same.

18. The method of claim 12, wherein said aqueous use solution is between approximately 0.1 ppm and about 50 ppm enzyme.

19. A method for enhancing sustainability of laundry water cleaning applications comprising:
   (a) generating an aqueous use solution by contacting an enzyme composition and detergent composition with water, wherein said aqueous use solution is between approximately 0.1 ppm and 100 ppm; and
   (b) cleaning a laundry water source with said aqueous use solution; and
   (c) enhancing sustainability of said laundry water source by improving water quality and minimizing water and energy consumption; and
   (d) recirculating the laundry water source in a cleaning system.

20. The method of claim 19, wherein said enzyme is a member selected from the group consisting of amylase, protease, lipase, cellulase, cutinase, gluconase, peroxidase and combinations of the same.

* * * * *